May 19, 1964 G. BANKO 3,133,385
PRECISION WORK-PIECE POSITIONING CROSS-SLIDE
Filed April 3, 1961 2 Sheets-Sheet 1
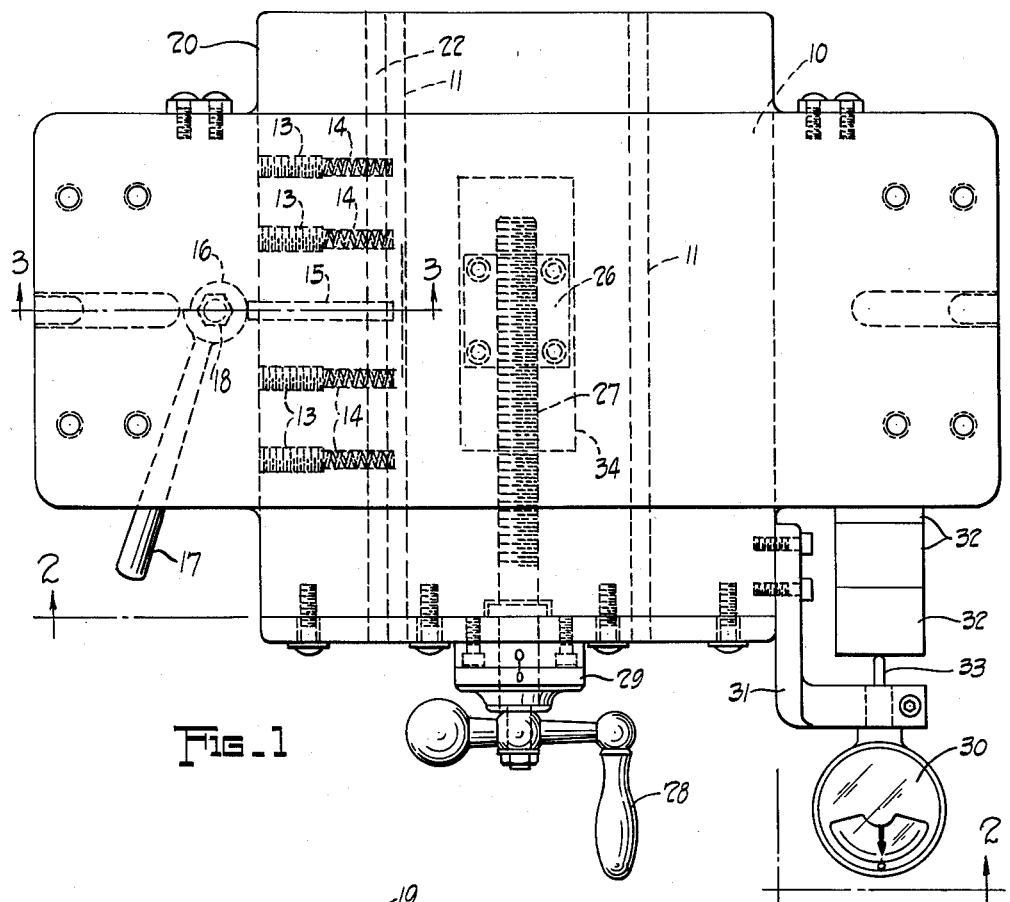
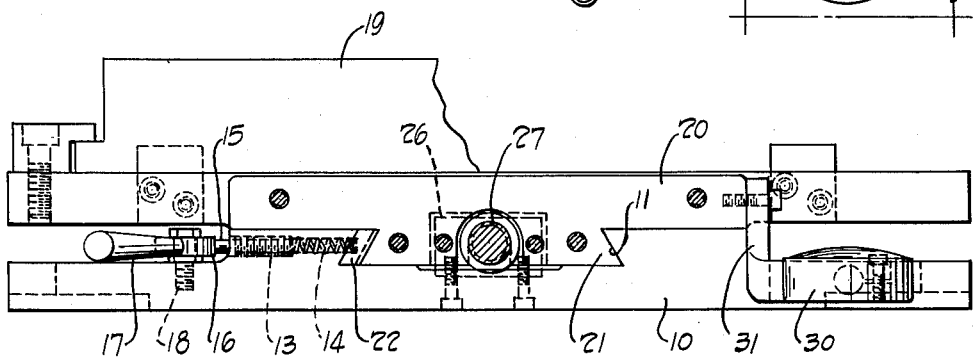
INVENTOR.
GEORGE BANKO
BY Sanford Schumacher
ATTORNEY.

May 19, 1964 G. BANKO 3,133,385
PRECISION WORK-PIECE POSITIONING CROSS-SLIDE
Filed April 3, 1961 2 Sheets-Sheet 2

INVENTOR.
GEORGE BANKO
BY
ATTORNEY.

United States Patent Office 3,133,385
Patented May 19, 1964

3,133,385
PRECISION WORK-PIECE POSITIONING
CROSS-SLIDE
George Banko, 1834 E. 223rd St., Euclid, Ohio
Filed Apr. 3, 1961, Ser. No. 100,080
1 Claim. (Cl. 51—240)

This invention relates to work-positioning devices and particularly to a precision cross-slide for an optical viewer grinding machine.

Conducive to a better understanding of the invention it may be well to point out that the instant device is intended for use with my Optical Viewer Profile Grinder described in U.S. Patent No. 2,481,381, and issued to me on Sept. 6, 1949.

With this type of machine the desired work profile is laid out at 25× or 50× enlargement on a translucent viewing screen. Once the work piece is properly positioned relative to the viewed outline, the operator simply grinds the solid work-piece until the projected work profile coincides precisely with the profile line of the drawing on the viewing screen. The image of both the work profile and drawing is sharply outlined on the viewing screen throughout the grinding operation and the progress of the grinding wheel can be observed perfectly. Thus, the grinding process can be controlled and followed during the whole operation, and time-consuming intermediate measurements or checks are entirely eliminated.

However, in order to hold the viewing screen to a reasonable size, such as 25" x 25", the working area is limited to approximately 1" x 1" at 25× enlargement and to ½" x ½" at 50× enlargement, which are the usual magnifications used depending upon the degree of accuracy required.

In order to form work-pieces of larger sizes and longer profiles, the so-called "overlay" method is employed. The surface to be ground is divided into several rectangles lying behind and next to each other. Each of the sides to be handled must not be over 1" or ½" similarly to to the operation in the direct working range, described above.

The various rectangles or segments are drawn one above the other on the layout, with the magnification selected, as is well known by those skilled in the art.

The various profile sections are ground one after the other. The work-piece is moved according to the distance between the end of one segment and the starting of the next. During the whole operation, the drawing remains stationary on the viewing screen.

In order to carry out the overlay method of grinding long and irregular profiles, it is necessary to move the work-piece accurately across the main optical axis of the viewer a measured distance for each cycle and hold it in locked position during the grinding of each section of the profile.

With an optical viewer grinding machine such as that described in my above identified patent, No. 2,481,381, work of extreme accuracy that is, in the order of less than ±.00001" tolerance, is readily produced.

If a conventional cross-slide is used to position the work-piece image relative to the segments of the viewed layout drawing, the mere act of locking the slide in place will move it out of adjustment and create enough distortion to disasterously effect the accuracy of the finished profile.

The primary object of this invention, therefore, is to provide a precision work-piece supporting cross-slide, for use with an optical viewer grinding machine, that has dove-tail shaped ways and a spring loaded gib in said ways to eliminate all backlash and distortion.

Another object is to provide a cross-slide of the type stated that is controlled by dial indicators and precision gauge blocks to insure accurate positioning of the supported work-piece.

A further object is to provide a cross-slide table having clamping means operable to hold the slide in adjusted positions without bending or distorting the slide.

These and other objects of the invention will become apparent from a reading of the following specification and claims, together with the accompanying drawings wherein like parts are indicated by like reference numerals, and wherein:

FIGURE 1 is a top plan view of the work positioning cross-slide for optical viewer profile grinders that is the subject of this invention;

FIGURE 2 is a front elevation of same, partly in section, taken along the line and in the direction of arrows 2—2 of FIGURE 1;

Figure 3:
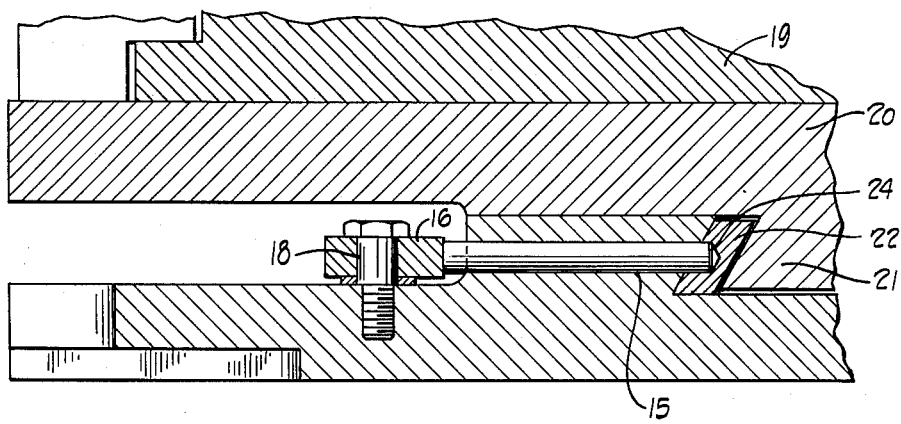
FIGURE 3 is a longitudinal sectional view through the lock plunger and gib taken along the line and in the direction of the arrows 3—3 of FIGURE 1.

Referring more particularly to FIGURE 1 of the drawing, there is seen the work positioning cross-slide of Optical Viewers and Surface Grinders that is the subject of this invention.

The device comprises a base 10 adapted to be clamped cross-wise of the main table of an optical viewer surface grinder, not illustrated.

Reference numeral 11 indicates a dove-tail shaped way or channel extended crosswise of the upper surface thereof. A cross slide 20 is slidably mounted on the top surface of the base 10 in interlocked engagement with the channel 11 through a dove-tail shaped tenon or tongue 21 of similar but reverse shape. A gib 22 is located in way channel 11, against which the slide tenon 21 is adapted to move translationally in the channel 11.

A threaded anchor block 26 is mounted on the base 10 within a clearance cavity 34 in the slide table 20. The block 26 is engaged by an accurately ground lead screw 27 which is mounted on the slide 20 and acts to move the slide 20 cross-wise of the base 10. The screw 27 is operated by a handle 28 and has a dial scale 29 to indicate increments of each revolution of the screw.

The gib 22 has spaced sockets 23 in the outer face thereof to receive the ends of the compression springs 14 which are located in spaced horizontal bores in the base 10. The springs 14 are adjusted by means of screws 13 and are along the length of the gib, as seen in FIGURE 1.

Figure 4:
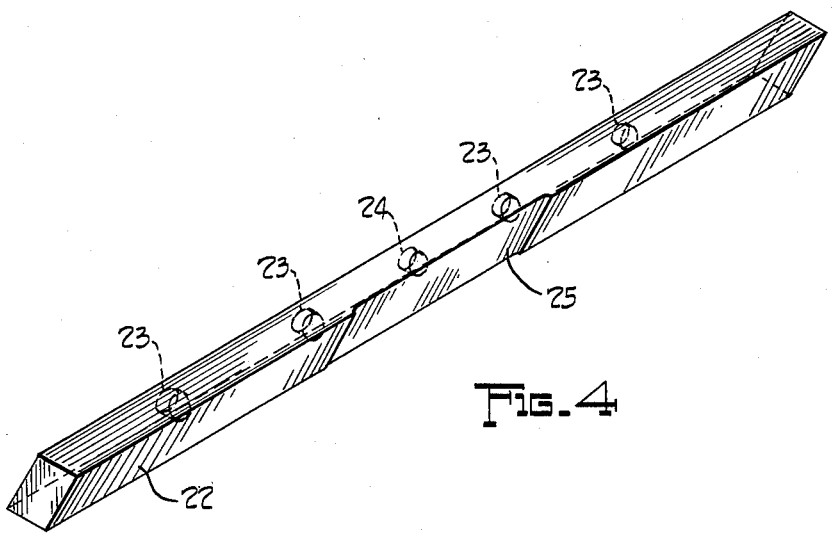
FIGURE 4 is a perspective view of the un-mounted gib.

Reference numeral 15 indicates a clamp plunger mounted in the base 10 with its end seated in a socket 24 in the gib 22 as seen most clearly in FIGURES 3 and 4. The plunger 15 is moved into compressed engagement with the gib 22 by a spiral cam 16 that is eccentrically mounted on a bearing post 18 and rotatable therearound by means of a radially extending handle 17. The spaced sockets 23 and 24, which engage the ends of the springs 14 and plunger 15, respectively, act to anchor the gib 22 against longitudinal movement of the dove-tail way 11 of the base 10.

A .0001" dial indicator 30 is mounted on the slide table 20 by means of a bracket 31 which holds the dial plunger 33 in operational horizontal alignment with a stage for holding the gauge blocks 32 on the base 10. The position of the slide table 20 with reference to the center of the base 10 can be accurately determined or re-established by use of appropriate gauge blocks 32 between the face of the base and the dial indicator plunger 33, as is well understood by those skilled in the art.

In operation the springs 14 are uniformly biased against the gib 22 by adjustment of the screws 13. These are adjusted so that the gib 22 bears against the tenon 21 with a constant pressure just short of that required to lock the cross-slide 20 against translational movement by the lead screw 27. As a result, there is no play, or looseness, between the dove-tail shaped ways 11 and the cross-slide tenon 21. The cross-slide 20 is moveable longitudinally of the way 11 without backlash. The cross-slide 20 may be clamped rigidly in any position by pulling up on the cam handle 17 which rotates the cam 16 against the plunger 15 which in turn presses against the gib 22 to urge same against the cross-slide tenon 21 in locked engagement.

Reference numeral 25 indicates a relief recess cut in the forward face of the gib opposite the plunger socket 24, which acts to compensate for any bow in the gib that might be occasioned by the pressure of the plunger against the center of the gib. Thus deformation of the gib due to the locking pressure is prevented.

The work-piece, not shown, may be held on the cross-slide 20 by any suitable means, such as the magnetic chuck 19, as indicated in FIGURES 2 and 3. The original positioning of the work-piece with reference to the profile image appearing as the first, or starting, segment on the viewing screen drawing, when employing the overlay method of profile development, is easily effected by the use of gauge blocks 32 of suitable width in relation to the pointer of the dial indicator 30. After the first section of the developed profile has been finished the plunger 15 is released, permitting the slide 20 to be moved crosswise of the base 10, a measured distance in rough adjustment, by the substitution or addition of gauge blocks 32 of suitable width. The slide 20 is then brought into accurate position ±.00001, with reference to the next segment of the optical viewer profile image by means of the indicator dial 30. Due to the constant and uniform pressure exerted by the spring loaded gib 22, there is no after movement, or backlash, when the lead screw handle 28 is released and no deflection of the cross-slide tenon 21 when the plunger 15 is moved into pressure locking engagement with the gib 22.

Due to the fact that the gib 22 is normally subject to lateral biasing pressure toward the cross-slide tenon 21, the slight increase of pressure needed to lock the cross-slide against movement is minimal and not enough to produce any deflection that will show up on a ±.0001″ dial indicator.

In addition to acting as a precision work-piece holding cross-slide for optical viewer profile grinding machines, this device can also be used with the optical unit, to provide a very practical comparator for point to point inspection.

Due to the fact that the gib 22 is always spring biased against the tenon 21, even when the plunger clamp 15 is released, there is a constant wiping fit between the two elements which acts to exclude metallic dust, and keeps the mating faces of the tenon 21 and groove 11 clean at all times.

It will now be clear that there has been provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

I claim:

A work-piece positioning device, comprising in combination, a base having a dove-tail shaped way, including a gib, extending cross-wise thereof; a work-piece holding slide mounted on the base, having a dove-tail shaped tenon of similar but reverse shape, adapted to seat in the way and to move translationally against the gib; the base having a plurality of spaced bores therein positioned the length of the way and intersecting the way wall at the gib; the gib having a similar number of sockets in the wall thereof, faced toward the base bores; a plurality of springs mounted in each of the base bores with their ends seated in the opposed gib sockets, adapted to urge the gib laterally toward the cross-slide tenon with a constant force; screw means mounted on the base and engaged with the slide to move same longitudinally of the base way against the constraining force of the springs; and plunger means mounted in the base between the spring bores, entirely independent of the springs, perpendicular to the gib face, and moveable between a first release position, and a second, lock position wherein it is pressed against the gib face to increase the lateral force exerted against the tenon, to lock the slide in adjusted positions.

References Cited in the file of this patent

UNITED STATES PATENTS

| | | |
|---|---|---|
| 1,060,758 | Hedstrom | May 6, 1913 |
| 1,072,495 | Priest | Sept. 9, 1913 |
| 1,365,536 | Nielsen | Jan. 11, 1921 |
| 1,835,328 | Parsons | Dec. 8, 1931 |
| 1,858,898 | Mesker | May 17, 1932 |
| 2,203,162 | Lee | June 4, 1940 |
| 2,293,880 | Armitage et al. | Aug. 25, 1942 |
| 2,373,929 | Turrettini | Apr. 17, 1945 |
| 2,552,645 | Oliver | May 15, 1951 |
| 2,685,727 | Walter | Aug. 10, 1954 |
| 2,822,644 | Bruderick | Feb. 11, 1958 |